(12) United States Patent
Brendelson et al.

(10) Patent No.: US 7,201,246 B2
(45) Date of Patent: Apr. 10, 2007

(54) ENGINE MOUNTING SYSTEM FOR A MOTORCYCLE

(75) Inventors: James C. Brendelson, Port Washington, WI (US); Michael J. Doperalski, Sussex, WI (US); Dominic Keogh, Germantown, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 11/107,552

(22) Filed: Apr. 15, 2005

(65) Prior Publication Data

US 2005/0178596 A1    Aug. 18, 2005

Related U.S. Application Data

(63) Continuation of application No. 10/618,081, filed on Jul. 11, 2003, now Pat. No. 6,902,023.

(51) Int. Cl.
*B62K 11/02* (2006.01)
*B62M 7/02* (2006.01)
*B60K 5/00* (2006.01)

(52) U.S. Cl. ............... 180/228; 180/219; 180/300

(58) Field of Classification Search ........... 180/218, 180/219, 228, 300, 227
See application file for complete search history.

(56) References Cited

U.S. PATENT DOCUMENTS

| | | | |
|---|---|---|---|
| 3,811,528 A | 5/1974 | Hooper | |
| 3,945,463 A | 3/1976 | Okano et al. | |
| 4,169,512 A | 10/1979 | Ishikawa et al. | |
| 4,323,135 A * | 4/1982 | Tominaga et al. | 180/228 |
| 4,373,602 A * | 2/1983 | Tomita et al. | 180/227 |
| 4,392,542 A | 7/1983 | Aiba | |
| 4,396,084 A | 8/1983 | Yoshimura et al. | |
| 4,412,597 A | 11/1983 | Aiba | |
| 4,453,616 A | 6/1984 | Porter | |
| 4,465,157 A | 8/1984 | Onishi et al. | |
| 4,497,285 A * | 2/1985 | Kondo | 123/41.65 |
| 4,550,698 A | 11/1985 | Konneker | |

(Continued)

FOREIGN PATENT DOCUMENTS

CA    866584    3/1971

(Continued)

OTHER PUBLICATIONS

Yamaha Star; 1998 Catalog; 2 facing pages (not numbered).

(Continued)

*Primary Examiner*—Lesley D. Morris
*Assistant Examiner*—Marc A. Scharich
(74) *Attorney, Agent, or Firm*—Michael Best & Friedrich LLP

(57) ABSTRACT

An engine adapted to mount to a frame assembly including a steering head, a downtube, a rear junction, a rear tie link, a front mount assembly, and an engine bracket. The engine includes a crankcase assembly having a rearward end defining a rear attachment point adapted to engage the rear junction, a rear tie link attachment portion disposed below the rear attachment point adapted to engage the rear tie link, and a forward end defining a forward attachment point adapted to engage the front mount assembly. An engine cylinder assembly extends from the crankcase assembly and is adapted to be coupled to the engine bracket.

12 Claims, 11 Drawing Sheets

U.S. PATENT DOCUMENTS

| | | | |
|---|---|---|---|
| 4,660,854 A | | 4/1987 | Suzuki et al. |
| 4,776,423 A | * | 10/1988 | Buell .................... 180/228 |
| 4,785,905 A | * | 11/1988 | Trema .................... 180/219 |
| 4,805,716 A | * | 2/1989 | Tsunoda et al. ............ 180/219 |
| 4,828,069 A | * | 5/1989 | Hatsuyama ............... 180/219 |
| 5,211,256 A | * | 5/1993 | Muramatsu ............... 180/219 |
| 5,248,012 A | | 9/1993 | Kurawaki et al. |
| 5,284,221 A | | 2/1994 | Warne |
| 5,361,864 A | * | 11/1994 | Tanaka .................... 180/219 |
| 5,375,677 A | * | 12/1994 | Yamagiwa et al. ......... 180/219 |
| 5,377,776 A | | 1/1995 | Saiki |
| 5,390,758 A | | 2/1995 | Hunter et al. |
| 5,417,305 A | * | 5/1995 | Parker .................... 180/219 |
| 5,469,930 A | | 11/1995 | Wiers |
| 5,704,442 A | | 1/1998 | Okazaki et al. |
| 5,845,728 A | | 12/1998 | Itoh et al. |
| 5,857,538 A | | 1/1999 | Chambers |
| 5,876,013 A | | 3/1999 | Ott |
| 5,921,339 A | | 7/1999 | Matsuura |
| 6,024,185 A | * | 2/2000 | Okada et al. ............... 180/227 |
| 6,085,855 A | | 7/2000 | Schanz et al. |
| 6,213,240 B1 | * | 4/2001 | Buell .................... 180/228 |
| 6,315,072 B1 | | 11/2001 | Brown et al. |
| 6,446,996 B1 | | 9/2002 | Horii |
| 6,547,207 B1 | | 4/2003 | Thompson |
| 6,846,018 B2 | * | 1/2005 | Dennert et al. ............. 280/785 |

FOREIGN PATENT DOCUMENTS

FR  662587  4/1929

OTHER PUBLICATIONS

XLH Models Service Manual; 1993 and 1994; pp. 3-9.
Harley Davidson; Parts Catalog; 1984 FXST; 1985 FX Models; pp. 68-69.
Harley Davidson; Parts Catalog; FXRP Models; Late 1984 to 1985; pp. 62-63.
Harley Davidson; Parts Catalog; 1987-1989; 1340 Big Twin; pp. 272-273.
Harley Davidson; Parts Catalog; XLH Models; 1986; pp. 54-55.
Harley Davidson; Parts Catalog; 1986-1989; Sportster Evolution 883, 1100, 1200; pp. 68-69.
Harley Davidson; Parts Catalog; 1993 and 1994; 1340 Models; pp. 114-127.
Harley Davidson; Service Manual; XLH Models; 1993 and 1994; Official Factory Manual; pp. 3/8 to 3/12.
Harley Davidson; Parts Catalog; Sportster-all models; 1995; pp. 60-61.
Custom Chrome; 1989 Catalog; Jan. 1, 1989; pp. 136-137.
Custom Chrome; 1994 Custom Chrome Catalog ' Jan. 1, 1994; pp. 370-371.
V-Twin; Uniquely V-Twin Manufacturing, Jan. 1, 1994; pp. 310-317.

* cited by examiner

ENGINE MOUNTING SYSTEM FOR A MOTORCYCLE

CROSS-REFERENCE TO RELATED APPLICATIONS

This application is a continuation of U.S. application Ser. No. 10/618,081, filed Jul. 11, 2003, now U.S. Pat. No. 6,902,023, the entire contents of which are incorporated herein by reference.

FIELD OF THE INVENTION

The present invention relates to motorcycles, and more specifically to motorcycle engine mounting systems.

BACKGROUND

Motorcycles generally include an internal combustion engine that is supported by some type of frame structure. During motorcycle operation, a motorcycle engine generates various types of vibrations that have frequency and amplitude characteristics that are often dependent upon the size and type of internal combustion engine. For example, an engine having an arrangement of four cylinders in a line generates vibrations that differ in frequency and amplitude when compared to vibrations generated by an engine having two cylinders arranged in a V configuration. Depending upon the type of engine in a given motorcycle, consideration must be given to the impact the specific type of vibrations generated by that engine may have on vehicle durability, rider comfort, and other factors.

While many techniques have been developed to isolate or reduce vibrations transmitted from the engine to the rest of the vehicle, one such technique includes supporting the engine within the frame using an arrangement of resilient engine mounts. While the specifics of construction vary significantly between motorcycles, most resilient mounting systems include two or more resilient mount assemblies that cooperate to support the engine while also isolating the frame, the rider, and several other vehicle components from the vibrations generated by the engine. One example of a vibration isolation system of this type is disclosed in U.S. Pat. No. 4,776,423 ("the '423 patent"), which is incorporated by reference herein. The '423 patent discloses an isolation system having a first resilient mount assembly supporting a rear portion of the motorcycle engine, and a second resilient mount assembly supporting a forward portion of the engine.

SUMMARY OF THE INVENTION

One embodiment of the present invention provides a motorcycle including an engine assembly that is resiliently supported by a frame assembly. A first mount assembly resiliently couples a rearward end of the engine to a rear junction of the frame, and a second mount assembly resiliently couples a forward end of the engine to a pair of downtube members of the frame. A first tie link extends generally transversely to the frame and is coupled to the rear junction and the rearward end. A second tie link also extends generally transversely to the frame and is coupled to at least one of the downtubes and the forward end of the engine. A third tie link also extends generally transversely to the frame and is coupled to a front cylinder head assembly of the engine, and to at least one of the downtubes near a steering head member of the frame. The tie links cooperate to prevent movement of the engine transversely with respect to the frame, while allowing movement of the engine in fore-aft and up-down directions with respect to the frame.

Each of the first and second mount assemblies can include a pair of substantially identical resilient mounts. Each mount has a frame interface that engages a surface of the frame, and an engine interface that engages a surface of the engine. The mounts are positioned between outboard frame members, and the engine includes a rear portion that is positioned between the mounts. A preload bracket is removably coupled to the frame and engages the frame interface of one of the mounts. The preload bracket is tightened to the frame to axially compress the first and second resilient mounts.

Each of the resilient mounts can include a substantially rigid plate that defines an aperture, and a substantially rigid flange member that has both an annular portion and a cylindrical portion. A first volume of resilient material extends between the rigid plate and the annular portion, and a second volume of resilient material extending radially inwardly from the cylindrical portion. A mounting shaft extends through the aperture and is therefore fixed with respect to the rigid plate. During motorcycle operation, the flange member moves with respect to the rigid plate and the mounting shaft. Upon sufficient movement of the rigid plate with respect to the flange member, the mounting shaft contacts the second volume of resilient material. As such, radial movement of the rigid plate with respect to the flange member, and therefore overall movement of the engine with respect to the frame, is limited.

In another aspect, the invention provides an engine for use with a motorcycle. The engine includes a crankcase assembly and a cylinder assembly extending from the crankcase assembly. The crankcase assembly defines a forward attachment point that is adapted to engage a front mount assembly of a frame. The crankcase also defines a rearward attachment point that is adapted to engage a rear junction of the frame. A bracket attaches to the cylinder assembly and is adapted to couple to the frame. In preferred constructions, the forward attachment point and the rearward attachment point are adapted to be resiliently coupled top the frame such that the forward attachment point and the rearward attachment point can move relative to the frame. In some constructions, a swing arm pivotally attaches to the rear junction.

Other features of the invention will become apparent to those skilled in the art upon review of the following detailed description, claims, and drawings.

Figure 1:
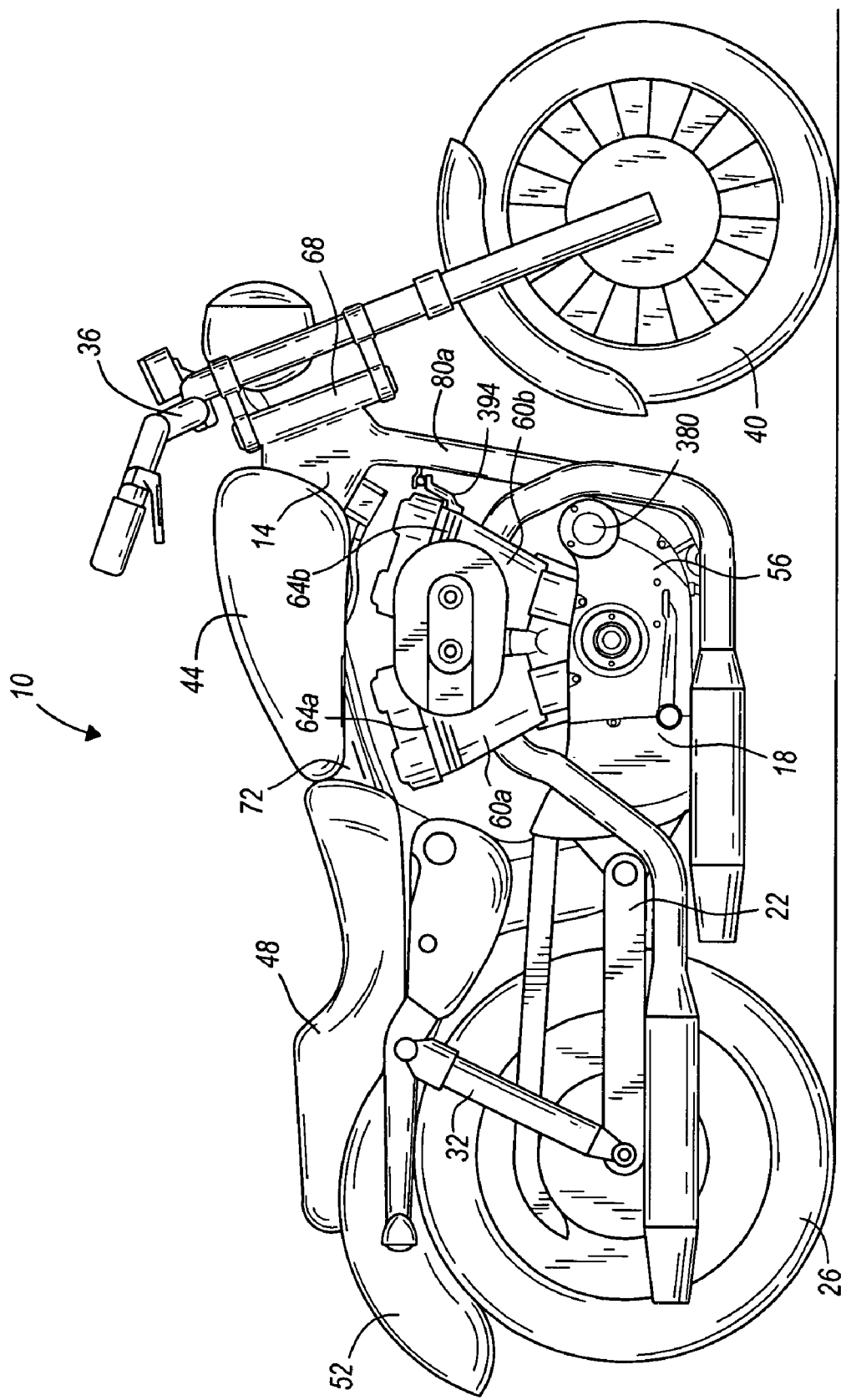
FIG. 1 is a side view of a motorcycle embodying some aspects of the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a motorcycle 10 including a frame 14, an engine assembly 18 supported by the frame 14, and a swingarm 22 pivotally coupled to the frame 14 and the engine assembly 18. The swingarm 22 rotatably supports a rear wheel 26, and a pair of rear shocks 32 (only one shock 32 is shown in FIG. 1) extend between the swingarm 22 and the frame 14. A steering assembly 36 is pivotally coupled to a forward portion of the frame 14 and rotatably supports a front wheel 40. A gas tank 44 is coupled to the frame 14 and positioned above the engine, a seat 48 is coupled to the frame 14 and positioned rearwardly of the gas tank 44, and a rear fender 52 is coupled to the frame 14 and positioned rearwardly of the seat 48, above the rear wheel 26.

The illustrated engine assembly 18 includes a crankcase assembly 56 that is resiliently coupled to the frame 14 as discussed further below. The engine assembly 18 further includes a pair of engine cylinders 60a, 60b that extend from the crankcase assembly 56 in a V configuration. Specifically, the cylinder 60a extends upwardly and rearwardly from the crankcase assembly 56, and the cylinder 60b extends upwardly and forwardly from the crankcase assembly 56. Respective cylinder heads 64a, 64b are coupled to the upper end of each engine cylinder 60a, 60b, and cooperate therewith to define cylinder assemblies.

Figure 2:
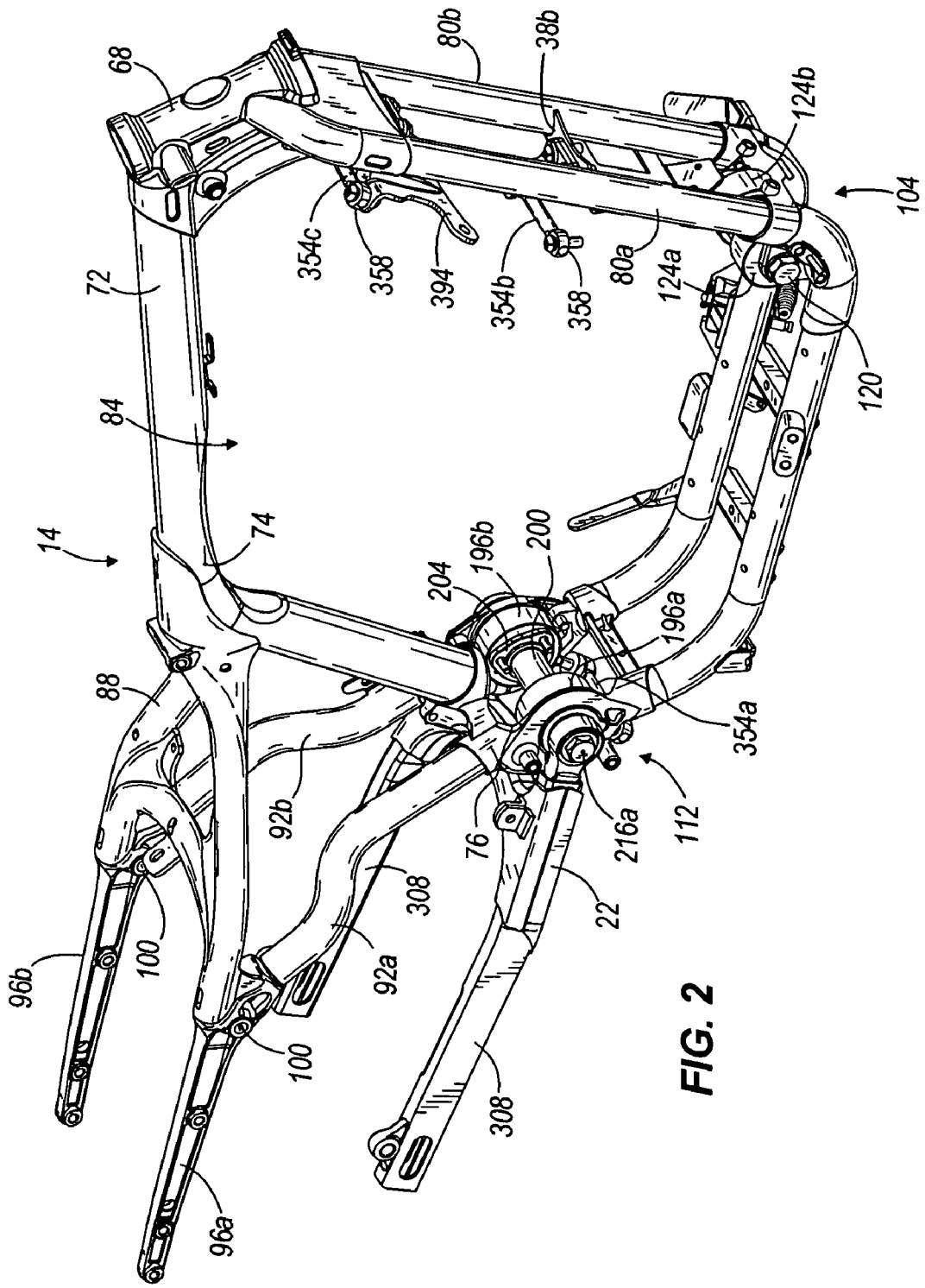
FIG. 2 is a perspective view of a frame assembly of the motorcycle illustrated in FIG. 1.
Figure 3:
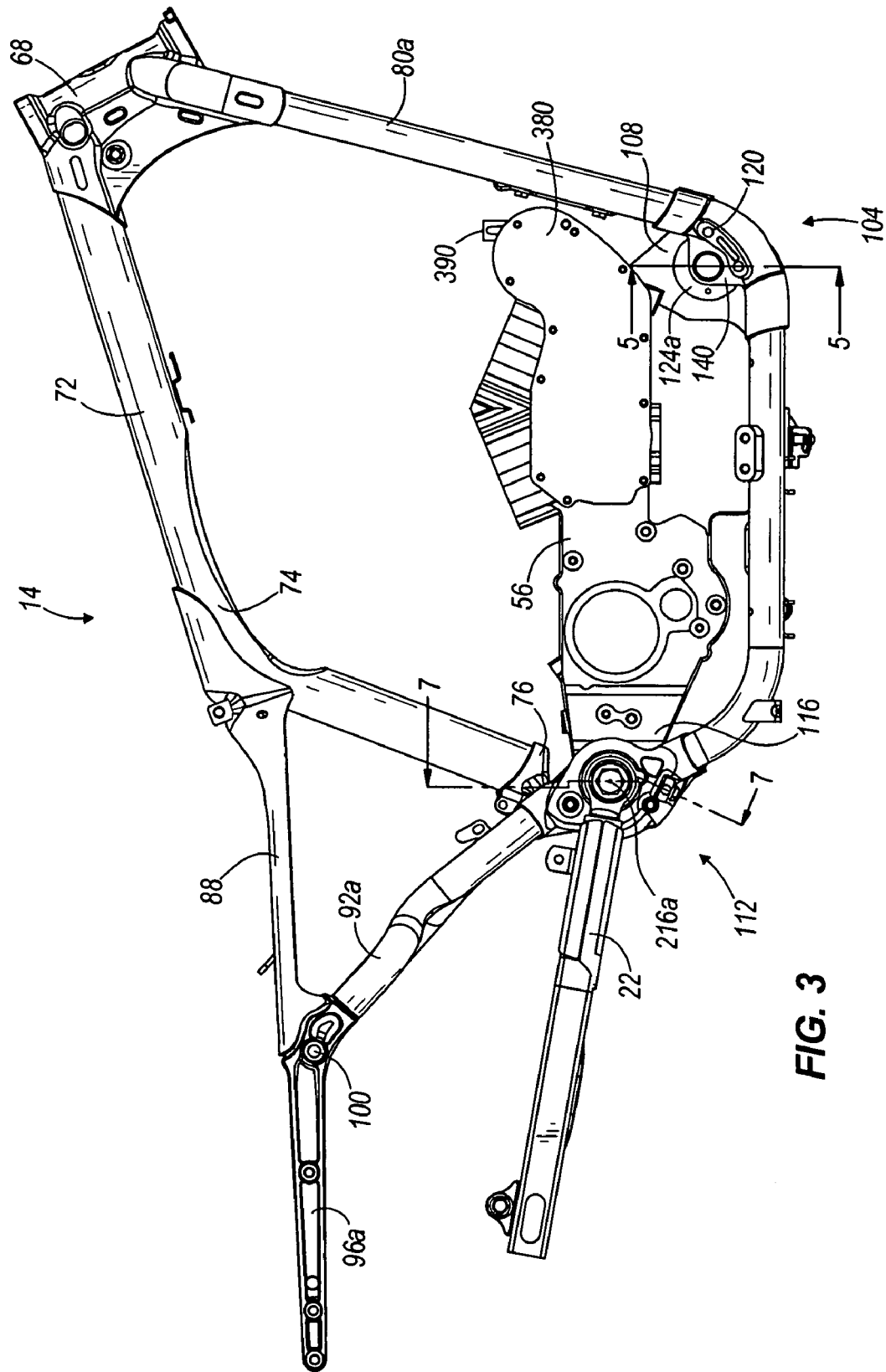
FIG. 3 is a side view of the frame assembly and an engine crankcase assembly of the motorcycle illustrated in FIG. 1.

Referring also to FIGS. 2 and 3, the frame 14 includes a steering head 68 that pivotally supports the steering assembly 36 (FIG. 1). A backbone 72 extends rearwardly from the steering head 68 and bends downwardly at a bend portion 74 to a rear junction 76. A pair of downtubes 80a, 80b extend downwardly from the steering head 68 and bend rearwardly to the rear junction 76. The backbone 72 and the downtubes 80a, 80b generally define an engine bay 84 in which the engine assembly 18 is received.

A generally Y-shaped seat pan 88 is coupled (e.g. welded) to the bend portion 74 of the backbone 72 and extends rearwardly therefrom. A pair of seat pan supports 92a, 92b extend upwardly and rearwardly from the rear junction 76 and support the rearward ends of the seat pan 88. A pair of fender supports 96a, 96b are coupled to both the seat pan 88 and the seat pan supports 92a, 92b, and extend rearwardly for support of the rear fender 52. The rear shocks 32 are coupled to upper shock mounts 100 defined by the fender supports 96.

The downtubes 80a, 80b support and partially define a front mount assembly 104 that resiliently supports a forward end 108 of the crankcase assembly 56 (FIG. 3). Similarly, the rear junction 76 supports and partially defines a rear mount assembly 112 that resiliently supports a rearward end 116 of the crankcase assembly 56 and the swingarm 22, the swingarm 22 being pivotally coupled to the rearward end 116.

Figure 4:
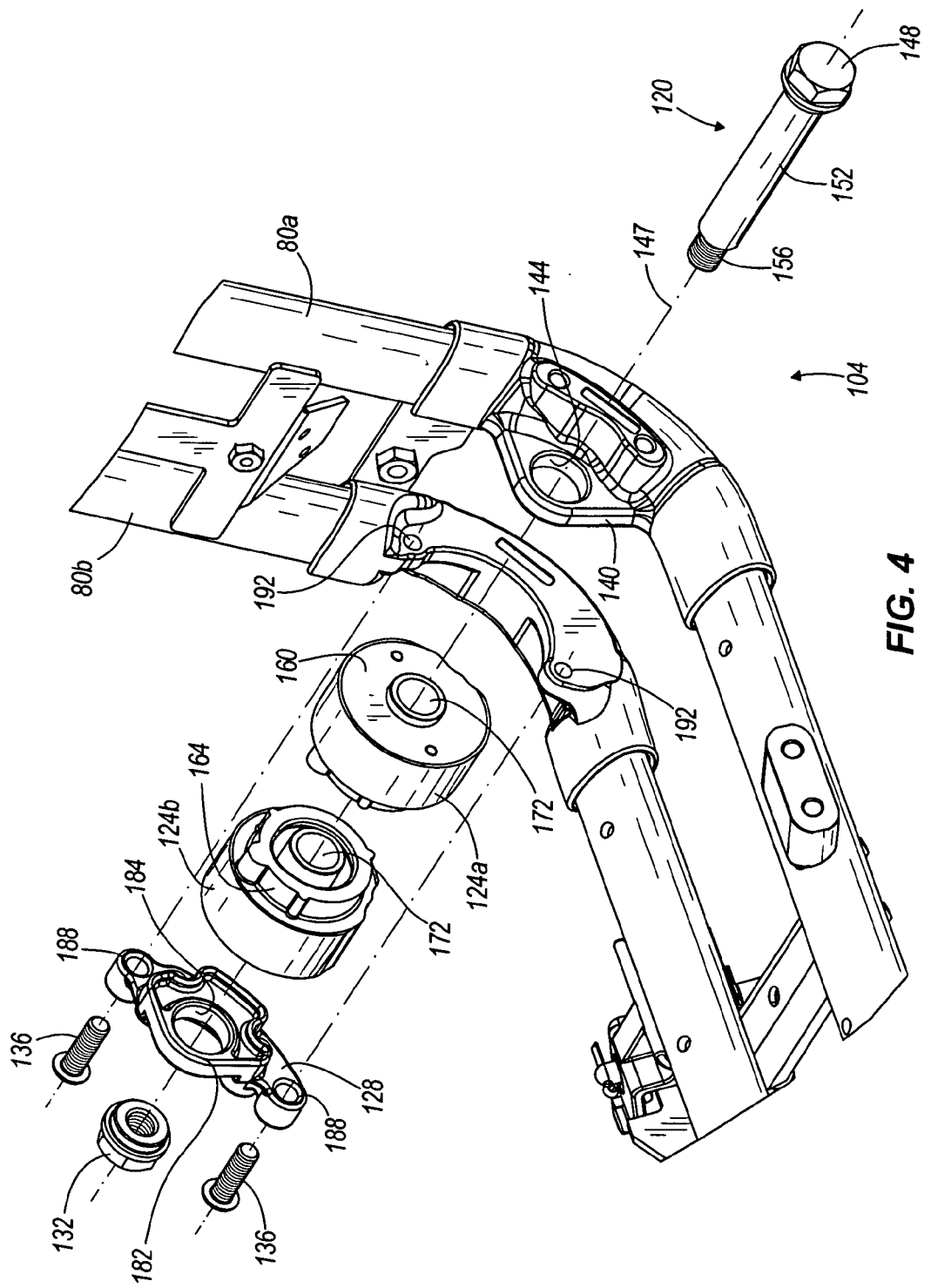
FIG. 4 is an exploded perspective view of a front mount assembly of the motorcycle illustrated in FIG. 1.
Figure 5:
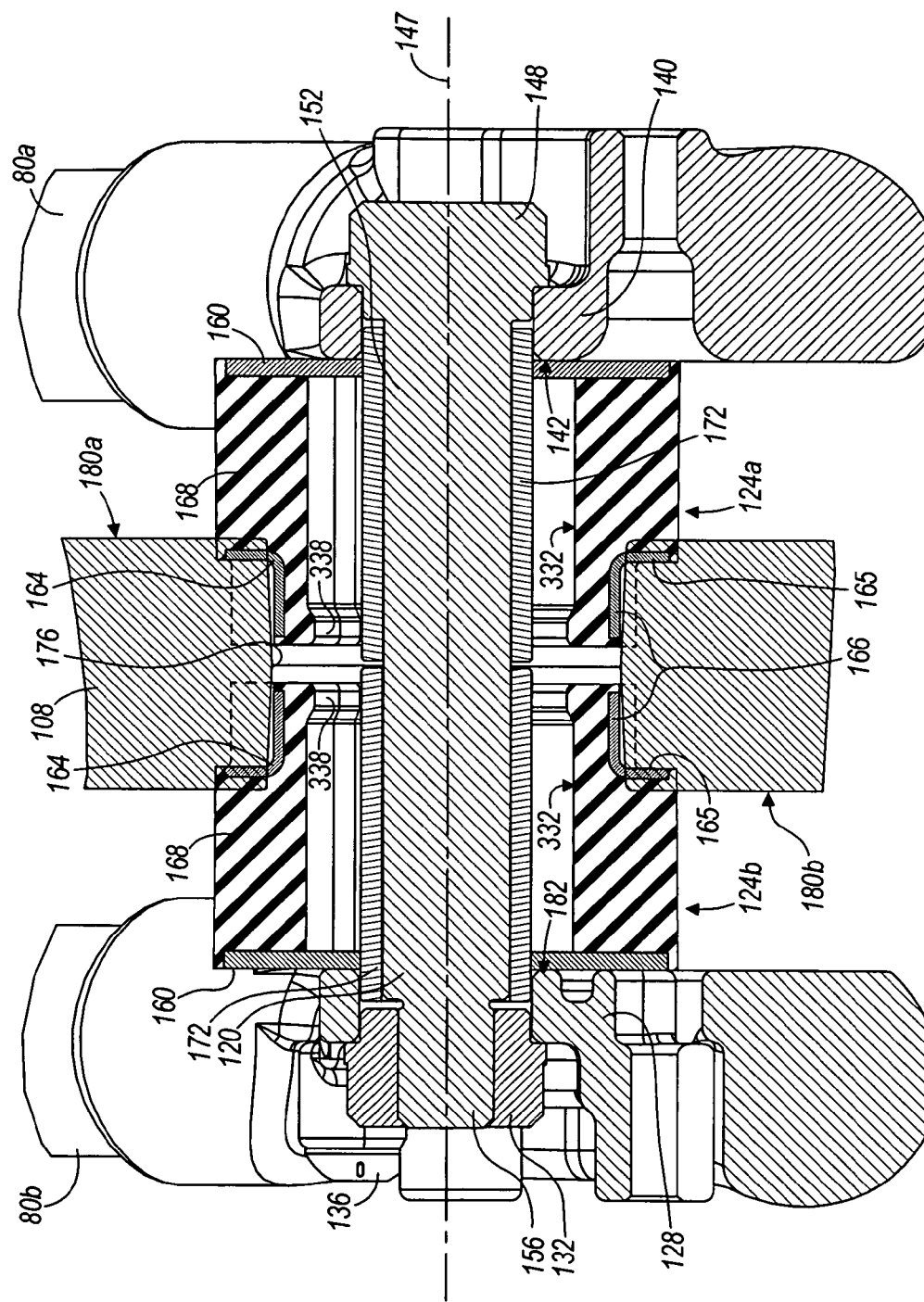
FIG. 5 is a section view of the front mount assembly taken along line 5—5 of FIG. 3.

With reference also to FIGS. 4 and 5, the front mount assembly 104 includes the downtubes 80a, 80b, a front mounting shaft 120, a pair of substantially identical front mounts 124a, 124b, a front mount bracket 128, a threaded member in the form of a shaft nut 132, and a pair of front bracket fasteners 136. One of the downtubes 80a includes a mounting ear 140 that defines a frame surface 142 (FIG. 5) and a mounting bore 144 that surrounds a front mounting axis 147. The front mounting shaft 120 includes a head portion 148, a shaft portion 152, and a threaded end portion 156. The shaft portion 152 extends through the mounting bore 144 and the head portion 148 engages the mounting ear 140.

The front mounts 124a, 124b are substantially cylindrical and receive the shaft portion 152 of the front mounting shaft 120. Each front mount 124a, 124b includes a frame interface defined by a substantially annular plate 160, and an engine interface defined by a generally cylindrical flange 164 that is axially spaced from the annular plate 160. The flange 164 includes an annular portion 165 and a cylindrical portion 166 that extends axially from the annular portion 165. A resilient mass 168 is bonded to and extends between the annular plate 160 and the cylindrical flange 164. A sleeve 172 extends through the annular plate 160 and projects axially beyond the annular plate 160 on one end of the front mount 124, and axially beyond the annular portion 165 of the flange 164 on the opposite end of the front mount 124. In the illustrated construction, the sleeve 172 is lightly press-fit into the annular plate 160 to aid in assembly.

The annular plate 160 of the front mount 124a abuts the mounting ear 140 of the downtube 80 and the corresponding axially projecting portion of the sleeve 172 extends into the mounting bore 144, thereby positively locating the front mount 124a with respect to the frame 14. The cylindrical portion 166 of the flange 164 is received by a bore 176 defined by the forward end 108 of the crankcase assembly 56, and the annular portion 165 abuts a side surface 180a of the forward end 108.

The annular portion 165 of the other front mount 124b abuts an opposite side surface 180b of the forward end 108, and the cylindrical portion 166 of the other front mount 124b extends into the bore 176 toward the cylindrical portion 166 of the front mount 124a. The front mounts 124a, 124b therefore sandwich the forward end 108 of the crankcase between the flanges 164. Also, the sleeve 172 of the front mount 124b receives the shaft portion 152 of the front mounting shaft 120.

A bracket surface 182 of the front mount bracket 128 abuts the annular plate 160 of the front mount 124b. The front mount bracket 128 also defines a central aperture 184 that receives the axially projecting portion of the sleeve 172 and the threaded end portion 156 of the front mounting shaft 120. The front mount bracket 128 also defines a pair of apertures 188 that receive the front bracket fasteners 136. The downtube 80b defines a pair of threaded bores 192 into which the front bracket fasteners 136 are threaded.

As illustrated in FIG. 5, the front mounts 124a, 124b have an axial length extending from the annular plate 160 to the annular portion 165 of the flange 164 that is greater than the common axial distance between the mounting ear 140 and the surface 180a, and the surface 180b and the secured front mount bracket 128. Thus, as illustrated, the front mounts 124a, 124b are in an axially relaxed state. It should be appreciated however that when the front bracket fasteners 136 are tightened into the threaded bores 192, the flanges 164 engage the surfaces 180a, 180b of the forward end 108 of the crankcase assembly 56. The resilient mass 168 of each front mount 124a, 124b is therefore axially compressed or "preloaded" a predetermined amount such that the front mounts 124a, 124b provide certain vibration-isolation characteristics.

As discussed above, the front mounting shaft 120 extends through the mounting ear 140, the sleeves 172 of the front mounts 124a, 124b, and the front mount bracket 128. The shaft nut 132 receives the threaded end portion 156 of the mounting shaft 120 and is tightened to fasten the mounting shaft 120 in place. The configuration of the front mount assembly 104 is such that tightening of the front mount bracket 128 applies substantially all of the axial preload to the mounts 124a, 124b, while the mounting shaft 120 provides proper axial alignment of the various components, particularly during assembly.

Figure 6:
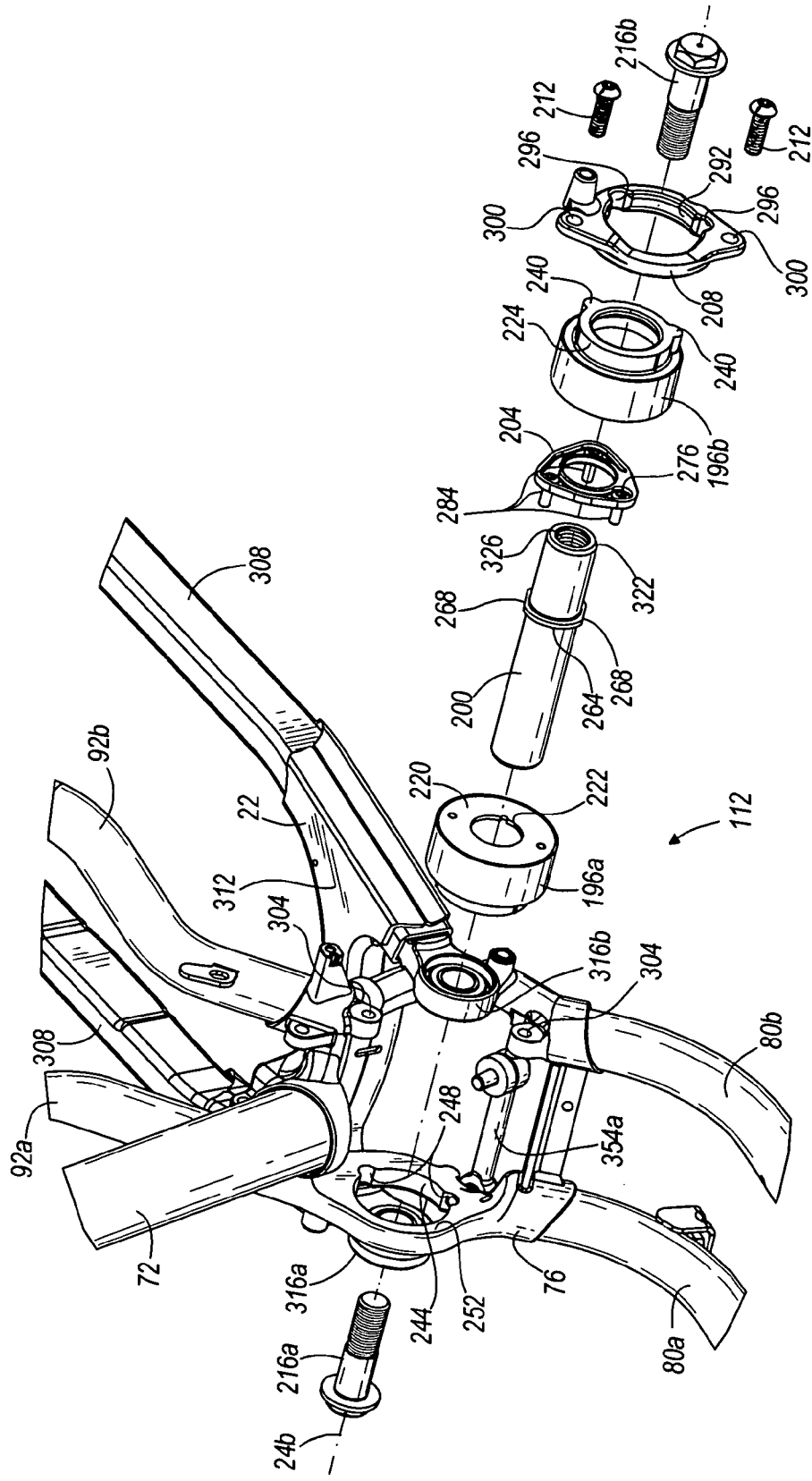
FIG. 6 is an exploded perspective view of a rear mount assembly of the motorcycle illustrated in FIG. 1.
Figure 7:
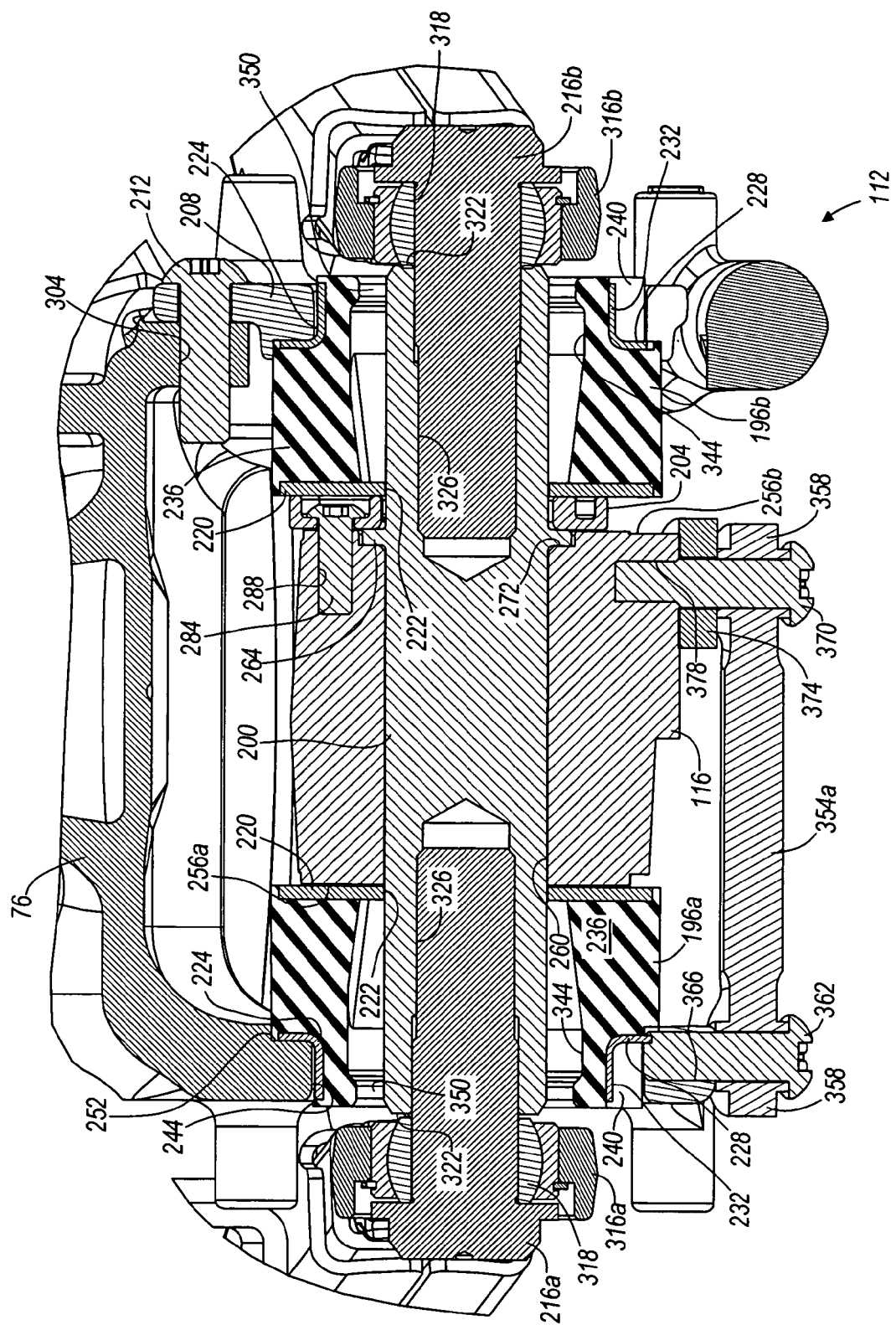
FIG. 7 is a section view of the rear mount assembly taken along line 7—7 of FIG. 3.

Referring also to FIGS. 6 and 7, the rear mount assembly 112 includes the rear junction 76, the swingarm 22, a pair of substantially identical rear mounts 196a, 196b, a rear pivot shaft 200, an engine bracket 204, a rear mount bracket 208, a pair of rear mount fasteners 212, and a pair of threaded members in the form of pivot bolts 216a, 216b. The rear mount assembly 112 has a configuration that is somewhat similar to the front mount assembly 104 in that the rear mount bracket 208 applies axial preload to the rear mounts 196a, 196b, while the rear pivot shaft 200 provides axial alignment of the various components.

The rear mounts 196a, 196b, like the front mounts 124a, 124b, are substantially cylindrical and receive the rear pivot shaft 200. Each rear mount 196a, 196b includes an engine interface defined by a substantially annular plate 220 that defines an aperture 222, and a frame interface defined by a generally cylindrical flange 224 that is axially spaced from the annular plate 220. In this regard, the rear mounts 196a, 196b are oriented in a manner opposite of the front mounts 124a, 124b. The flange 224 includes an annular portion 228 and a cylindrical portion 232 that extends axially from the annular portion 228. A resilient mass 236 is bonded to and extends between the annular plate 220 and the cylindrical flange 224. A pair of locating projections 240 extend radially from the cylindrical portion 232 and are formed of the resilient mass 236.

The rear junction 76 defines a mount opening 244 that surrounds a rear mounting axis 246 and receives the cylindrical portion 232 of the rear mount 196a. The mount opening 244 is provided with radially extending cutouts 248 that receive the locating projections 240 to assure proper orientation of the rear mount 196a upon assembly. The annular portion 228 of the flange 224 abuts an inner surface 252 of the rear junction 76. The rearward end 116 of the crankcase assembly 56 defines opposed mounting surfaces 256a, 256b and a mounting bore 260 (FIG. 7). The mounting surface 256a abuts the annular plate 220 of the rear mount 196a. The rear pivot shaft 200 extends through the mounting bore 260 and through the aperture 222 in the annular plate 220. The rear pivot shaft 200 is provided with a radially extending collar portion 264 that includes a pair of flats 268.

A corresponding recess 272 (FIG. 7) is defined in the mounting surface 256b and receives the collar portion 264 and engages the flats 268 to substantially prevent rotation of the rear pivot shaft 200 with respect to the crankcase assembly 56.

The engine bracket 204 is substantially triangular in shape and defines a central bore 276 that receives the rear pivot shaft 200. The engine bracket 204 abuts the mounting surface 256b. Engine fasteners 284 extend through the engine bracket 204 and into threaded bores 288 defined in the rearward end 116 of the crankcase assembly 56 (only one threaded bore 288 is illustrated in FIG. 7), thereby coupling the rear pivot shaft 200 to the rearward end 116.

The annular plate 220 of the rear mount 196b receives the rear pivot shaft 200 and engages the engine bracket 204. The flange 224 of the rear mount 196b is received by and engages the rear mount bracket 208. Specifically, the rear mount bracket 208 defines an aperture 292 that receives the cylindrical portion 232, and that includes radial recesses 296 that receive the locating projections 240 for proper alignment of the rear mount 196b during assembly. The rear mount bracket 208 also includes mounting apertures 300 that receive the rear mount fasteners 212, which are in turn threaded into threaded openings 304 (only one threaded opening is illustrated in FIG. 7) provided in the rear junction 76. As with the front mount assembly discussed above 104, tightening the rear mount fasteners 212 axially compresses the rear mounts 196a, 196b, while the rear pivot shaft 200 provides axial alignment of the various components. FIG. 7 is similar to FIG. 5 in that the rear mounts 196a, 196b are illustrated in a non-axially-compressed state.

The swingarm 22 includes a pair of rearwardly extending legs 308, a crossover portion 312, and a pair of forwardly extending pivot arms 316a, 316b. Spherical bearings 318 are mounted within each pivot arm 316a, 316b and are substantially axially aligned. The swingarm 22 is configured such that when the spherical bearings 318 are axially aligned with the rear pivot shaft 200, each spherical bearing 318 engages or nearly engages a corresponding end surface 322 of the rear pivot shaft 200. The pivot bolts 216a, 216b are extended through the corresponding spherical bearing 318 and are threaded into threaded bores 326 defined by the rear pivot shaft 200, thereby pivotally coupling the swingarm 22 to the rear pivot shaft 200. The configuration of the rear mount assembly 112, and in particular the interface between the rear pivot shaft 200 and the pivot bolts 216a, 216b, is such that the swingarm 22 can be removed and installed without changing the axial compression of the rear mounts 196a, 196b.

The front and rear mount assemblies 104, 112 resiliently support the engine 18 within the frame 14 to reduce the levels of engine vibrations that are transmitted to the rider during motorcycle operation. The resilient masses 168, 236 are configured to have stiffness properties suitable for isolating specific types of vibrations that are a function of, among other things, the size and configuration of the engine. The location and configuration of the front and rear mount assemblies 104, 112 are selected to isolate engine vibrations that tend to move the engine in a plane that is substantially perpendicular to the front mounting shaft 120 and the rear pivot shaft 200.

Figure 9:
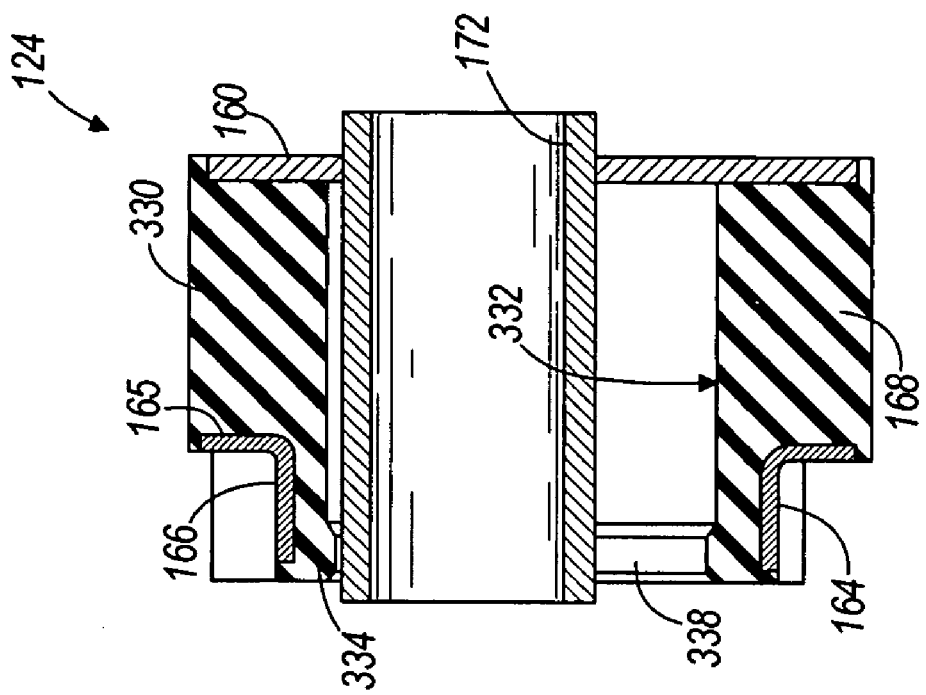
FIG. 9 is a section view of the front mount taken along line 9—9 of FIG. 8.
Figure 8:
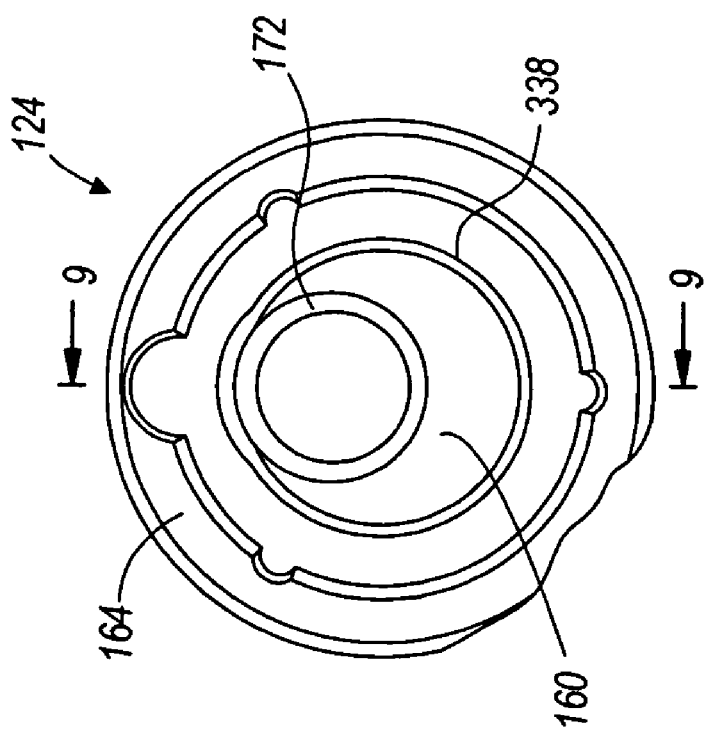
FIG. 8 is an end view of a front mount of the front mount assembly illustrated in FIG. 4.

Referring also to FIGS. 8 and 9, the front mount 124 is shown in an unloaded condition in which the front mount 124 is not installed on the motorcycle. As illustrated, the aperture in the annular plate 160 through which the sleeve 172 extends is slightly off-center with respect to the flange 164. As illustrated in FIGS. 4 and 5 however, when the front mount 124 is installed in the motorcycle 10, the weight of the engine assembly 18 causes the annular plate 160 to shift with respect to the flange 164, such that the sleeve 172 is substantially centered with respect thereto. This "sagging" of the front mount 124 radially preloads the resilient mass 168 in a manner similar to the way the front mount bracket 128 axially preloads the resilient mass 168, as discussed above. The offset of the sleeve 172 with respect to the flange 164 and the stiffness of the resilient mass 168 are selected such that the weight of the engine assembly 18 carried by the front mounts 124a, 124b is sufficient to substantially center the sleeves 172 of each mount 124a, 124b with respect to the flanges 164.

The resilient mass 168 includes a first volume of resilient material 330 that extends between the annular plate 160 and the annular portion 165 of the flange 164. The first volume of resilient material 330 defines a generally cylindrical inner surface 332. The resilient mass 168 also includes a second volume of resilient material 334 that extends radially inwardly from the cylindrical portion 166 of the flange 164 and that defines a radially inwardly extending circumferential rib 338. As illustrated in FIG. 8, the sleeve 172 contacts or nearly contacts the circumferential rib 338 when the front mount 124 is in the unloaded condition.

When the mount 124 sags upon installation on the motorcycle 10, the flange 164, which is coupled to the engine assembly 18, moves and becomes substantially concentric with respect to the sleeve 172 and the annular plate 160, which are coupled to the frame 14, as discussed above. During motorcycle operation, the flange 164 moves with respect to the sleeve 172 and the annular plate 160 in response to, among other things, engine vibration loads, loads due to engine speed changes, and bump loads that are transmitted from the road and into the mounts 124 through the rear wheel 26 and swingarm 22. Movement of the flange 164 in this manner and corresponding deflection of the resilient mass 168 isolates the motorcycle rider and motorcycle components from portions of these loads which might otherwise cause rider discomfort or reduce component life.

Under certain operating conditions, such as passing over a large bump, the loads placed on the mounts 124 may be sufficient to deflect the flange 164 radially with respect to the plate 160 to a point where the circumferential rib 338 contacts the sleeve 172, thereby resiliently limiting further radial movement of the flange 164 beyond a predetermined amount. Limiting the movement of the flange 164 with respect to the annular plate 160 and the sleeve 172 in this manner is referred to as "snubbing", and can be employed to improve mount durability. More specifically, the sleeve 172 and the circumferential rib 338 cooperate to substantially prevent the mount 124 from passing through the unloaded condition during motorcycle operation. In the illustrated construction, the mounts 124 are configured such that the amount of radial movement of the flange 164 with respect to the plate 160 that occurs before snubbing is substantially the same in all directions. Snubbing also positively limits movement of the engine 18 with respect to the frame 14.

Figure 11:
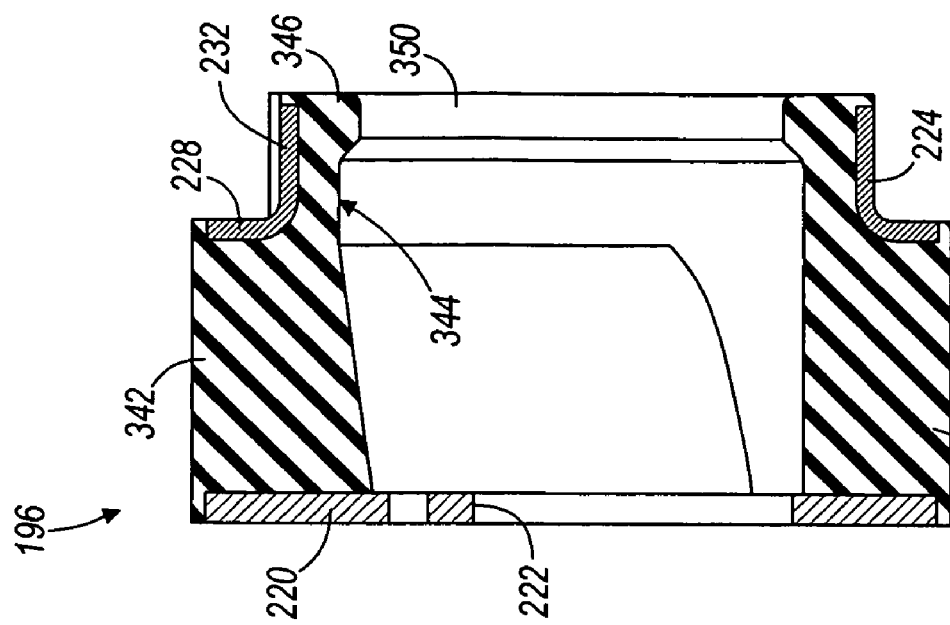
FIG. 11 is a section view of the rear mount taken along line 11—11 of FIG. 10.
Figure 10:
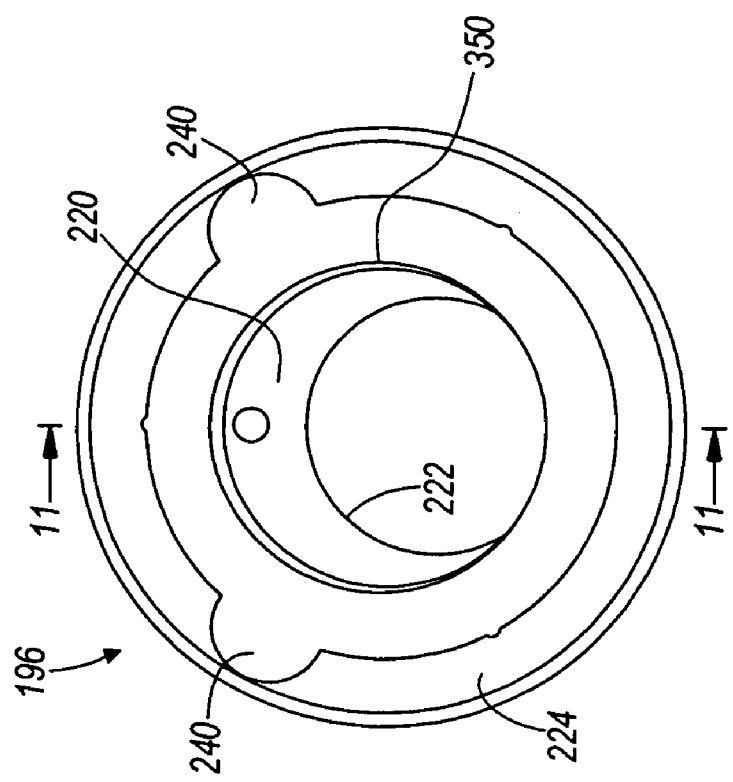
FIG. 10 is an end view of a rear mount of the rear mount assembly illustrated in FIG. 6.

Referring also to FIGS. 10 and 11, the rear mount 196 is configured similarly to the front mount 124 and also incorporates snubbing features. When installed in the motorcycle 10, the flange 224 of the rear mount 196 engages the frame 14 and is therefore held substantially fixed, while the annular plate 220 receives the rear pivot shaft 200 and is coupled for movement with the engine 18 and swingarm 22. As discussed above with respect to the front mount 124, the weight of the engine assembly 18 causes the rear mount 196 to sag when installed in the motorcycle 10, such that the aperture 222 in the annular plate 220, and therefore the rear pivot shaft 200, is substantially centered with respect to the flange 224. The rear mounts 196a, 196b illustrated in FIGS. 6 and 7 are shown radially deflected, as they would be when installed in the motorcycle 10.

The resilient mass 236 of the rear mount 196 includes a first volume of resilient material 342 that extends between the annular plate 220 and the annular portion 228 of the flange 224, and that defines a generally cylindrical inner surface 344. The resilient mass 236 also includes a second volume of resilient material 346 that extends radially inwardly from the cylindrical portion 232 of the flange 224 and defines a radially inwardly extending circumferential rib 350. Under certain operating conditions, such as those discussed above with respect to the front mount, the resilient mass 236 may deflect sufficiently such that the rear pivot shaft 200 contacts the circumferential rib 350, thereby resiliently limiting the movement of the annular plate 220 with respect to the flange 224, and substantially preventing the mount 196 from passing through the unloaded condition during motorcycle operation.

Although the front and rear mount assemblies 104, 112 are configured to isolate vibrations that occur as the engine assembly 18 moves substantially in a single plane (e.g. up-down and fore-aft with respect to the frame 14), the resiliency of the mounts 124, 196 also allows the engine assembly 18 to deflect laterally with respect to the frame 14. Because the swingarm 22 is pivotally coupled to the rearward end 116 of the crankcase assembly 56, the swingarm 22 is therefore also allowed to deflect laterally with respect to the frame 14. Lateral movement of the swingarm 22 in this manner is undesirable due to the resulting misalignment of the rear wheel 26 with respect to the front wheel 40. Excessive misalignment of the front and rear wheels 40, 26 may adversely impact the handling characteristics of the motorcycle 10.

Certain handling maneuvers place lateral loads on the rear wheel 26 and therefore urge the rear wheel 26 out of alignment with the front wheel 40. Due to the resilient nature of the front and rear mounts 124, 196, a plurality of tie links 354 (FIG. 2) are provided and are coupled between the engine assembly 18 and the frame 14 to limit transverse movement of the engine assembly 18 with respect to the frame 14, thereby maintaining the desired alignment between the front and rear wheels 40, 26.

Referring to FIGS. 2, 7, 12 and 13, each tie link 354 extends generally transversely with respect to the frame 14 and has a fixed axial length. Spherical bearings 358 are provided each end of the tie links 354. A first tie link 354a (FIG. 12) is positioned adjacent the rear mount assembly 112 and is coupled to rear lower portion of the engine assembly 18. A second tie link 354b (FIG. 13) is positioned approximately mid-way between the front mount assembly 104 and the steering head 68, and is coupled to front lower portion of the engine assembly 18. A third tie link 354c (FIG. 13) is positioned just below the steering head 68 and is coupled to a front upper portion of the engine assembly 18. Each tie link 354 extends transversely with respect to the frame 14. The tie links 354 cooperate to substantially prevent transverse movement of the engine assembly 18 due to their fixed lengths, while the spherical bearings 358 allow the engine assembly 18 to move in the fore-aft and up-down directions to provide vibration isolation, as discussed above.

Figure 12:
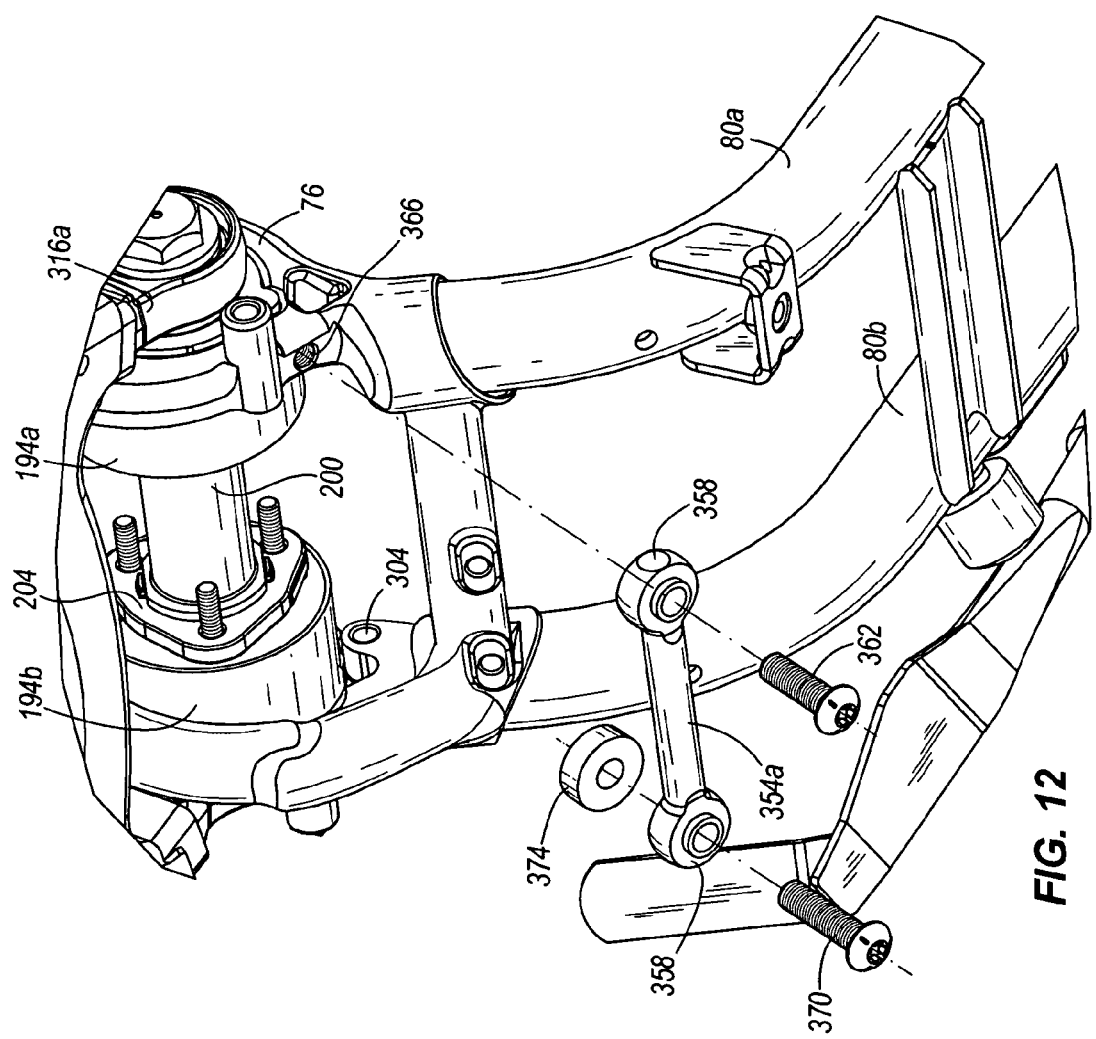
FIG. 12 is an exploded perspective view of a first tie link assembly of the motorcycle illustrated in FIG. 1.

As illustrated in FIG. 12, the first tie link 354a is coupled to and extends between the rear junction 76 and the rearward end 116 of the crankcase assembly 56. Specifically, a frame fastener 362 extends through one of the spherical bearings 358 and into a threaded bore 366 defined by the rear junction 76. An engine fastener 370 extends through the other spherical bearing 358, through an annular spacer 374, and into a threaded bore 378 defined by the rearward end 116 of the crankcase assembly (see FIG. 7). Although the tie link 354a is coupled to the rearward end 116 below the rear mount assembly 112 in the Figures, the tie link 354a can also be coupled to the rearward end in a variety of other locations including behind or above the rear mount assembly 112, for example.

Figure 13:
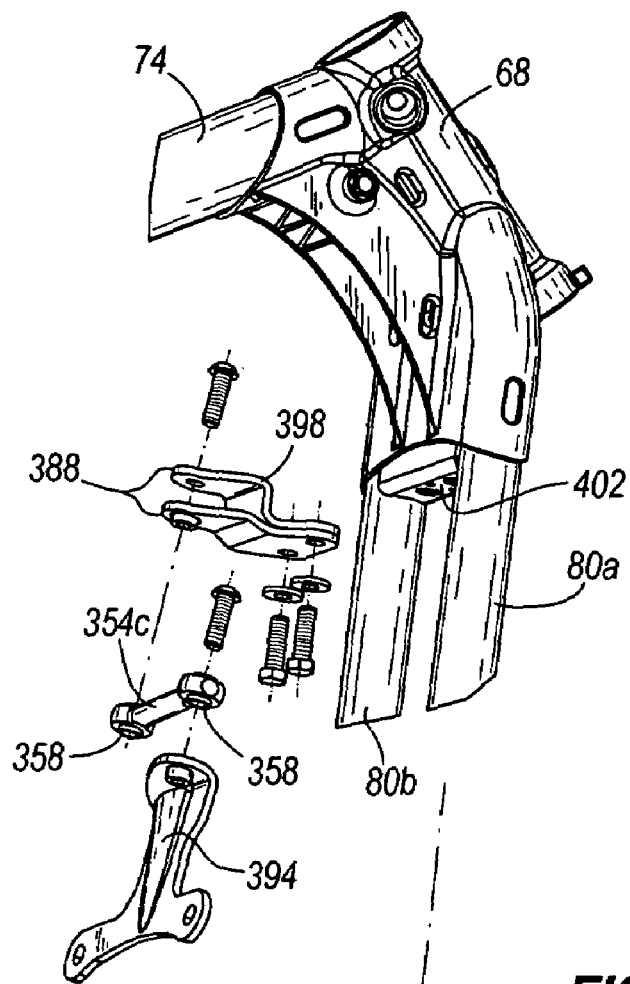
FIG. 13 is an exploded perspective view of second and third tie link assemblies of the motorcycle illustrated in FIG. 1.
Figure 13:
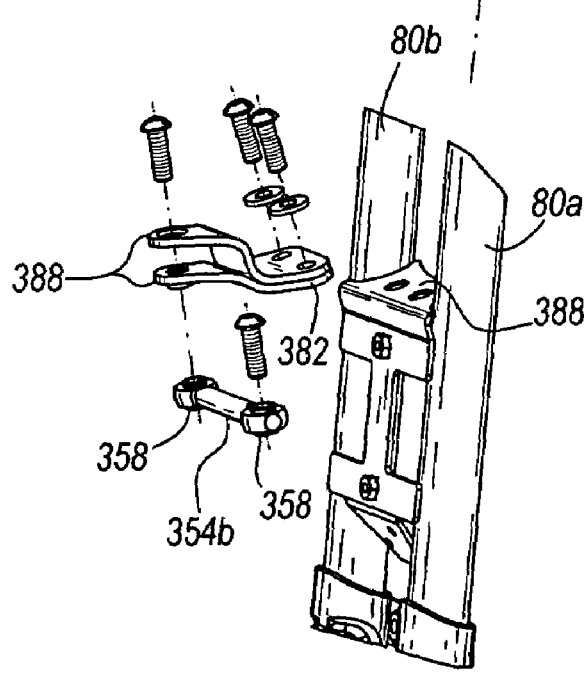

As illustrated in FIG. 13, the second tie link 354b is coupled to and extends between a forward portion 380 of the crankcase assembly 56 and a first frame bracket 382 that is coupled to the downtubes 80a, 80b. Specifically, a first cross brace 386 extends between the downtubes 80a, 80b, and the first frame bracket 382 is coupled to the cross brace 386. The first frame bracket 382 defines a pair of mounting arms 388 that receive between them one of the spherical bearings 358. The other spherical bearing 358 is coupled to a tie link boss 390 provided on the forward portion 380 of the crankcase assembly 56 (see FIG. 3).

The third tie link 354c is coupled to and extends between an engine bracket 394 that is coupled to a forward surface of the cylinder head 64 (see FIG. 1), and a second frame bracket 398 that is coupled to the downtubes 80a, 80b just below the steering head 68. In the illustrated construction, the first and second frame brackets 382, 398 are substantially identical. The second frame bracket 398 is coupled to a second cross brace 402 and receives one of the spherical bearings 358 of the third tie link 354c. The other spherical bearing 358 is coupled to the engine bracket 394, and the engine bracket is coupled to the cylinder head 64 by a pair of engine screws (not shown).

It should be appreciated that more or fewer tie links 354 may be utilized depending upon the specific application. The locations of the tie links 354 may also vary. However, testing has indicated that coupling the third tie link 345c between the front of the cylinder head 64 and a location on the frame 14 that is adjacent the steering head 68 significantly improves certain handling characteristics of the motorcycle 10.

Various features of the invention are set forth in the following claims.

The invention claimed is:

1. An engine adapted to mount to a frame assembly having a steering head, a downtube, a rear junction, a rear tie link, a front mount assembly, and an engine bracket, the engine comprising:
   a crankcase assembly having a rearward end defining a rear attachment point adapted to engage the rear junction, a rear tie link attachment portion disposed below the rear attachment point and adapted to engage the rear tie link, and a forward end defining a forward attachment point adapted to engage the front mount assembly, the rear tie link extending substantially transversely with respect to the engine; and
   an engine cylinder assembly extending from the crankcase assembly and adapted to be coupled to the engine bracket.

2. The engine of claim 1, wherein the engine cylinder assembly extends generally upwardly and forwardly from the crankcase assembly and toward the steering head.

3. The engine of claim 1, wherein the forward attachment point is adapted to resiliently engage the front mount assembly such that the forward attachment point is movable relative to the frame.

4. The engine of claim 1, wherein the rear attachment point is adapted to resiliently engage the rear junction such that the rear attachment point is movable relative to the frame.

5. The engine of claim 1, wherein the forward attachment point includes a first side surface, a second side surface, and an aperture extending between the first side surface and the second side surface.

6. The engine of claim 1, wherein the engine cylinder assembly includes a cylinder and a cylinder head coupled to the cylinder, and wherein the cylinder head is adapted to engage the engine bracket.

7. An engine assembly for a motorcycle having
   a frame assembly having a steering head, a rear junction, and a plurality of members extending between the steering head and the rear junction,
   a swingarm pivotally coupled to the rear junction,
   a first mount assembly resiliently coupled to the rear junction,
   a second mount assembly resiliently coupled to at least one of the plurality of members,
   a first tie link extending substantially transversely with respect to the frame assembly and coupled to the rear junction and disposed beneath the rear junction,
   a second tie link extending substantially transversely with respect to the frame assembly and coupled to at least one of the plurality of members, and
   a third tie link extending substantially transversely with respect to the frame assembly and coupled to one of the steering head and at least one of the plurality of members, the third tie link positioned above the second tie link and the second mount assembly, the engine assembly comprising:
      a crankcase assembly having a rearward end adapted to be resiliently coupled to the first mount assembly and to be coupled to the first tie link and a forward end adapted to be resiliently coupled to the second mount assembly and to be coupled to the second tie link,
      at least one engine cylinder assembly extending from the crankcase assembly and adapted to be coupled to the third tie link, the first, second, and third tie links extending substantially transversely with respect to the engine assembly.

8. The engine assembly of claim 7, wherein the cylinder assembly extends generally upwardly and forwardly from the crankcase assembly and toward the steering head.

9. The engine assembly of claim 7, wherein the engine cylinder assembly includes a first cylinder assembly and a second cylinder assembly positioned forwardly of the first cylinder assembly, wherein the second cylinder assembly is adapted to engage the frame assembly via the third tie link.

10. The engine assembly of claim 9, wherein each cylinder assembly includes an engine cylinder coupled to the crankcase assembly and a cylinder head coupled to a distal end of a respective engine cylinder, and wherein the cylinder head of the second cylinder assembly is adapted to engage the third tie link.

11. The engine assembly of claim 10, wherein the cylinder head of the second cylinder assembly is positioned rearward of the third tie link.

12. An engine adapted to mount to a frame assembly having a steering head, a downtube, a rear junction, a rear tie link, a front mount assembly, and an engine bracket, the engine comprising:
   a crankcase assembly having a rearward end defining a rear attachment point adapted to engage the rear junction, a rear tie link attachment portion disposed below the rear attachment point and adapted to engage the rear tie link, and a forward end defining a forward attachment point adapted to engage the front mount assembly, the rear tie link extending substantially transversely with respect to the engine; and an engine cylinder assembly extending from the crankcase assembly and adapted to be coupled to the engine bracket, wherein the forward attachment point includes a first side surface, a second side surface, and an aperture extending between the first side surface and the second side surface, and wherein the first side surface, the second side surface, and the aperture are adapted to cooperate to receive a first resilient member and a second resilient member.

* * * * *